United States Patent

Muramatsu et al.

[11] Patent Number: 5,960,147
[45] Date of Patent: Sep. 28, 1999

[54] PROBE, MANUFACTURING METHOD THEREFOR AND SCANNING PROBE MICROSCOPE

[75] Inventors: Hiroshi Muramatsu; Noritaka Yamamoto; Norio Chiba; Kunio Nakajima, all of Chiba, Japan

[73] Assignee: Seiko Instruments Inc., Japan

[21] Appl. No.: 08/821,533

[22] Filed: Mar. 21, 1997

[30] Foreign Application Priority Data

| Apr. 9, 1996 | [JP] | Japan | 8-086894 |
| Apr. 24, 1996 | [JP] | Japan | 8-102918 |
| Aug. 6, 1996 | [JP] | Japan | 8-207306 |
| Dec. 19, 1996 | [JP] | Japan | 8-340068 |

[51] Int. Cl.$^6$ .............. G02B 6/02; G02B 21/00; G01N 23/00
[52] U.S. Cl. .............. 385/123; 385/31; 385/39; 385/43; 385/127; 385/133; 385/146; 385/147; 385/902; 359/368; 250/306; 250/311
[58] Field of Search .............. 385/15, 12, 27, 385/28, 31, 32, 33, 38, 39, 43, 49, 123, 128, 127, 133, 147, 901, 902, 146; 359/368; 250/306, 311

[56] References Cited

U.S. PATENT DOCUMENTS

| 4,917,462 | 4/1990 | Lewis et al. ................... 250/216 X |
| 5,254,854 | 10/1993 | Betzig ............................. 250/234 |
| 5,260,824 | 11/1993 | Okada et al. ................... 359/368 |
| 5,485,536 | 1/1996 | Islam ............................. 385/31 |
| 5,570,441 | 10/1996 | Filas et al. ...................... 385/43 |
| 5,664,036 | 9/1997 | Islam ............................. 385/31 |
| 5,693,938 | 12/1997 | Marchman et al. ............. 250/234 |

FOREIGN PATENT DOCUMENTS

| 634681A1 | 1/1995 | European Pat. Off. ........... 385/123 X |
| WO95/05000 | 2/1995 | WIPO ............................ 385/123 X |
| WO95/33207 | 12/1995 | WIPO ............................ 385/123 X |

Primary Examiner—Brian Healy
Attorney, Agent, or Firm—Adams & Wilks

[57] ABSTRACT

A tip of a probe is sharpened and a level difference portion 6 in a boundary zone between a base portion 5 and an elastic functioning portion 4 is formed into a tapered configuration. The diameter of the elastic functioning portion 4 is made smaller than that of the base portion 5. Also, a part of the elastic functioning portion 4 is shaped into a constricted configuration. Also, the probe material is an optical fiber and this probe is composed of a core portion 2 that propagates light therethrough and clad portions 3 that differ in refractive index from each other. And the portion of the probe that excludes a aperture is clothed by a metal film cladding 7.

57 Claims, 6 Drawing Sheets

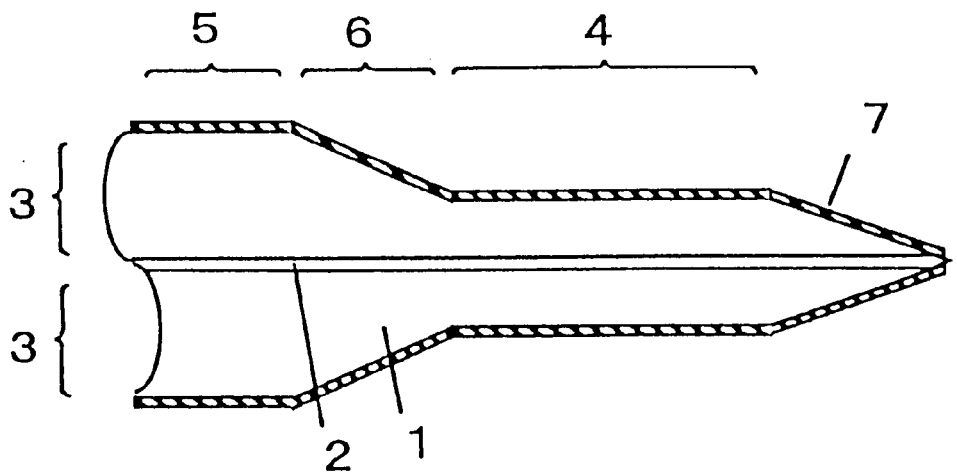
F I G. 1
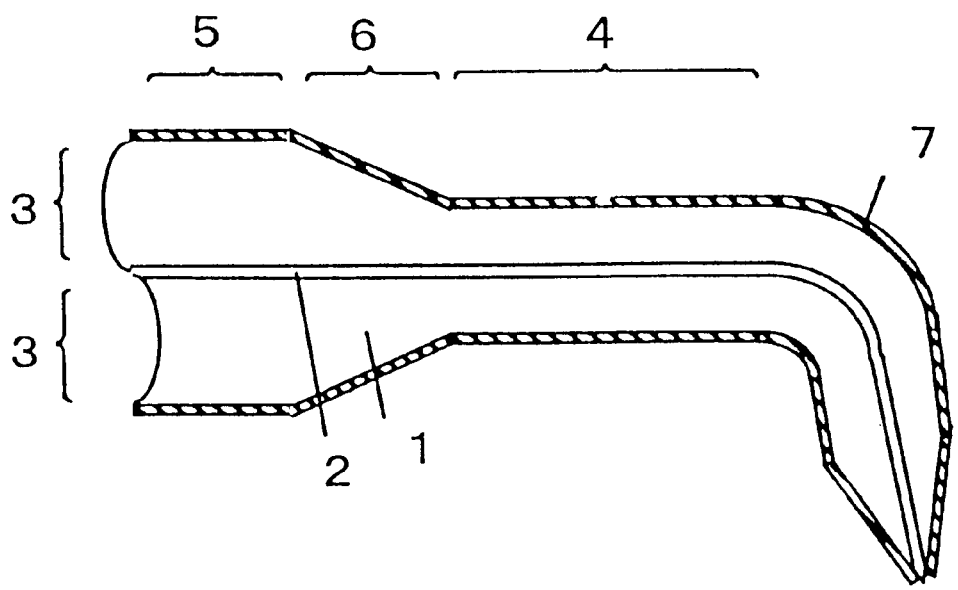
F I G. 2

PROBE, MANUFACTURING METHOD THEREFOR AND SCANNING PROBE MICROSCOPE

BACKGROUND OF THE INVENTION

The present invention relates to a probe that is used in a near field scanning microscope which is one of the scanning probe microscopes and adapted to measure the optical characteristics of a measuring substance in a fine region thereof, a probe that is used in an atomic force microscope which is also one of the scanning probe microscopes and adapted to serve the same purpose, a manufacturing method for these probes and a scanning probe microscope that uses these probes.

Scanning probe microscopes that are represented by atomic force microscopes (hereinafter referred to simply as "AFM") and scan-type tunnel microscopes (hereinafter referred to simply as "STM") have been widely used because of their enabling the observation of a fine topography of the surface of a sample. The use of the AFM enables the observation of a fine topography of a sample irrespective of whether or not this sample has conductivity compared to the STM. The measuring method of the AFM is based on the utilization of the fact that a spring element which supports a measuring probe becomes flexed by an atomic force that aces between the sample and the measuring probe.

On the other hand, there have been several attempts to measure the optical characteristics and topography of a sample by approaching a probe that consists of a optical waveguide whose tip is sharpened to a measuring sample until the distance therebetween becomes shorter than the wavelength of light, whereupon several near field optical microscopes have been proposed. As one of these microscopes there has been proposed an apparatus which horizontally vibrates the tip of the probe relative to the surface of the sample, the probe being held vertically relative thereto, detects the variation in the amplitude of the vibration that occurs due to the friction between the surface of the sample and the tip of the probe as the displacement of the optical axis of a laser light that has been radiated from the tip of the probe and has transmitted through the sample, moves the sample by a fine moving mechanism and thereby maintains the interval between the tip of the probe and the surface of the sample to be at a fixed value, and detects the surface topography of the sample from the intensity of the signal input to the rinse moving mechanism and simultaneously measures the light transmission characteristic of the sample.

Also, there has been proposed a near field scanning microscope which uses the probe that has been shaped like a hook as an AFM cantilever, vibrates the tip of the probe vertically relative to the surface of the sample, detects the variation in the amplitude of the vibration that occurs due to the action of the atomic force between the surface of the sample and the tip of the probe by the reflection of a laser light that has been radiated onto the probe, moves the sample by a fine moving mechanism and thereby maintains the interval between the tip of the probe and the surface of the sample to be at a fixed value, detects the surface topography of the sample from the intensity of the signal input to the fine moving mechanism, and simultaneously radiates a laser light from the tip of the probe onto the sample to thereby measure the optical characteristics of the sample.

In the above-mentioned scanning probe microscopes each using a probe that consists of an optical waveguide, the detection of the variation in the amplitude of the vibration occurring due to the friction between the surface of the sample and the tip of the probe, or the detection of the atomic force acting on the surface of the sample and the tip of the probe, is performed using the elastic function of the probe. Conventionally, as this elastic function, the elasticity of the optical waveguide itself is used as is.

Whereas the spring constant of the cantilever of the AFM is in a range of from 1/100 N/m to 1/10 N/m or so, the spring constant of the optical fiber is in a range of from several N/m to several ten N/m when utilizing the elastic function of the optical fiber itself. In a range wherein the near field microscopes are applied, it is considered to use a relatively large number of soft samples such as biological samples and high-molecular samples. The use of the optical fiber probe that utilizes the elastic function of the optical fiber itself with respect to these soft samples deforms these samples inconveniently. In addition, there was also the likelihood of causing damages to the tip of the probe. Further, although in the case of performing scanning control utilizing the resonance vibration of the probe the higher the resonance frequency the higher the scanning speed, when making short the elastic functioning portion that corresponds to the cantilever and thereby making the resonance frequency high, there was the problem that the spring constant thereof became further increased.

Also, where mounting the probe onto the quartz oscillator and detecting the atomic force acting between the surface of the sample and the tip of the probe or other forces associated with the interaction therebetween as the variation in the resonance characteristic of the quartz oscillator, when the spring constant and weight of the elastic functioning portion are respectively at large values, the detection sensitivity of the quartz oscillator deteriorates, with the result that here arises the problem that it is impossible to sufficiently detect weak forces such as the above-mentioned atomic forces. While in order to maintain the detection sensitivity (Q value) of the quartz oscillator it is needed to use a large quartz oscillator, there has been the problem that the spring constant becomes inconveniently large.

SUMMARY OF THE INVENTION

An object of the present invention is to make the spring constant of the probe small.

Another object of the present invention is to realize a probe which enables the measurement of the sample through a relatively soft contact of the probe with the sample.

A further object of the present invention is to realize a high resolution scanning probe microscope.

In order to attain the above objects, according to the present invention, a portion of the probe having an elastic function, the probe having the elastic function in the vicinity of a tip portion thereof, has been formed integrally with a base portion that supports this elastic functioning portion and, also, the probe has been formed such that the outer configuration of the elastic functioning portion is smaller in diameter than the outer configuration of the base portion. Also, a constricted portion has been provided in a part of the elastic functioning portion. Also, the probe has been shaped like a circular cylindrical column, a tip portion of which has been shaped like a hook or straight line. Also, the level difference in a boundary zone between the base portion and the elastic functioning portion has been tapered. Also, on the elastic functioning portion, there has been loaded a piezoelectric member that can electrically detect the distortions that are associated with the elastic function.

On the other hand, a step of manufacturing a probe has been made to include a step of decreasing the outside diameter of a part of the probe material and a step of sharpening a tip portion of the probe.

Also, the step of manufacturing the probe has been made to include the step of decreasing the outside diameter of a part of the probe material, the step of sharpening the tip portion of the probe and a step of shaping into a hook like configuration the tip portion of the probe and a portion thereof that is continuous to this tip portion.

Also, the step of manufacturing the probe has been made to include the step of decreasing the outside diameter of a part of the probe material, the step of sharpening the tip portion of the probe and a step of forming a constricted portion in a part of the elastic functioning portion.

Also, the step of manufacturing the probe has been made to include the step of decreasing the outside diameter of a part of the probe material, the step of sharpening the tip portion or the probe, the step of shaping into a hook like configuration the tip portion of the probe and a portion thereof that is continuous to this tip portion and the step of forming a constricted portion in a part of the elastic functioning portion.

Among these steps of manufacturing the probe, the step of decreasing the outside diameter of a part of the probe material and the step of sharpening the tip portion of the optical waveguide have been executed as a wet chemical etching step that uses the same etching solution, which wet chemical etching step has been executed as the execution of the sub-steps of immersing the probe in an etching solution and thereby decreasing the outside diameter thereof, next drawing it up from the etching solution by a required length, and further continuing the etching operation and sharpening the tip portion of the probe. The etching solution that is used in this step has been made to be an etching solution that consists of a first solution layer that consists mainly of hydrofluoric acid and a second solution layer that is smaller in specific gravity than the first solution layer and that does not react, and is not mixed, with the first solution layer.

Also, a step that is supplementary to the step of sharpening the tip portion of the probe has been executed as a step of applying a pulling force to the optical waveguide while heating it by heating means to thereby break it.

Also, the step of forming a constricted portion in a part of the elastic functioning portion has been executed as the step of forming a protective film on the tip portion of the probe and a part, or the whole, of the elastic functioning portion and then forming the constricted portion by wet chemical etching. A step that is supplementary to the step of forming the constricted portion has been executed as the step of not using a protective film, an etching solution that is used in this step being prepared as an etching solution that consists of a first solution layer that consists mainly of hydrofluoric acid, a second solution layer that is smaller in specific gravity than the first solution layer and that does not react, and is not mixed, with the first solution layer and a third solution layer chat is greater in specific gravity than the first solution layer and that does not react, and is not mixed, with any one of the first and second layers.

The step of manufacturing the probe has been executed as the step of using a optical waveguide as the material of the probe, which has been prepared by adding to the overall step a step of depositing a metal cladding onto the tip portion of the probe that excludes an aperture.

BRIEF DESCRIPTION OF THE DRAWINGS

FIG. 1 is a sectional view illustrating a probe according to a first embodiment of the present invention;

FIG. 2 is a sectional view illustrating a hook-shaped probe according to a second embodiment of the present invention;

DETAILED DESCRIPTION OF THE PREFERRED EMBODIMENTS

Figure 3:
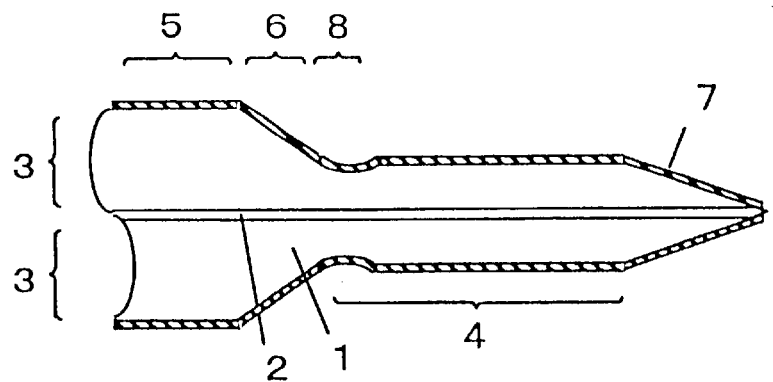
FIG. 3 is a sectional view illustrating a probe with a constricted portion according to a third embodiment of the present invention.

An embodiment of the present invention will now be explained with reference to the drawings. In this embodiment, an explanation will be given of a probe as an example which consists of an optical waveguide.

FIG. 1 is a sectional view illustrating the construction of an optical waveguide probe according to a first embodiment of the present invention.

An optical fiber 1 which is an optical waveguide is composed of a core portion 2 that propagates light therethrough and clad portions 3 that differ in refractive index from each other. A tip portion of the optical fiber 1 is made sharp and has an aperture 1a, the diameter of an intermediate or elastic functioning portion 4 is made smaller than the diameter of a base portion 5, and a level difference portion 6 in a boundary zone between the base portion 5 and the elastic functioning portion 4 is tapered. The tip portion of the probe that excludes the aperture 1a is clad by a metal film cladding 7. As the optical fiber 1 there can be used single mode fibers and multi-mode fibbers and further plane-of-polarization preservation fibers or the like that have various clad diameters and cladding diameters. As another optical waveguide it is also possible to use a capillary. As the material of the metal film cladding 7 there are used materials capable of reflecting light such as gold, platinum, aluminium, chromium, nickel, etc. In a case where the optical waveguide probe illustrated in FIG. 1 is loaded on a near field optical microscope that is of a type causing horizontal vibration of the tip of the probe relative to the surface of the sample, using the optical waveguide probe by supporting the base portion 5 thereof makes it possible to use it while maintaining a conventional mechanical strength of the supporting portion as is. Although the probe can be also used by supporting a part of the elastic functioning portion 4, the mechanical strength of the supporting portion deteriorates.

According to the above-mentioned construction of the optical waveguide, the spring constant of the elastic functioning portion can be made small in value, whereby measurement can be performed of a soft material without deforming the same. Also, it is possible to prevent the impairment of the sample and the tip of the probe. Further, in the case of performing scanning control by utilizing the resonance of the probe, it is possible to shorten the elastic functioning portion without increasing the spring constant and thereby increase the resonance frequency to thereby increase the scan speed. Also, by tapering the level difference in the boundary zone between the base portion and the elastic functioning portion, it is possible to enhance the clothability of the level difference portion by the metal film and thereby prevent the light leakage from the probe.

FIG. 2 is a sectional view illustrating the construction of a hook-shaped optical waveguide probe according to a second embodiment of the present invention.

An optical fiber 1 which is an optical waveguide is composed of a core portion 2 that propagates light therethrough and clad portions 3 that differ in refractive index from each other. A tip portion of the optical fiber 1 is made sharp and shaped into a hook, the diameter of the elastic functioning portion 4 is made smaller than the diameter of the base portion 5, and the level difference portion 6 in the boundary zone between the base portion 5 and the elastic functioning portion 4 is tapered. The tip portion of the probe that excludes an aperture 1a is clad by the metal film cladding 7. If the optical waveguide probe illustrated in FIG. 2 is loaded on a near field scanning microscope, using the optical waveguide probe by supporting the base portion 5 makes it possible to use it while maintaining a conventional mechanical strength of the supporting portion as is. Although the probe can be also used by supporting a part of the elastic functioning portion 4, the mechanical strength of the supporting portion deteriorates.

According to the above-mentioned construction of the optical waveguide probe, it is possible to make small in value the spring constant of the elastic functioning portion and measure a soft sample without deforming it. Also, it is possible to prevent the impairment of the sample and the tip of the probe. Further, in the case of performing scanning control by utilizing the resonance of the probe, it is possible to shorten the elastic functioning portion without increasing the spring constant to thereby increase the resonance frequency and hence increase the scanning speed. Also, by tapering the level difference in the boundary zone between the cylindrical columnar base portion and elastic functioning portion, it is possible to enhance the clothability of the level difference portion by the metal film and thereby prevent the occurrence of the optical leakage of the probe. On the other hand, even in the case of using the probe in a contact mode of an AFM apparatus, in which control is performed without using the resonance of the optical waveguide probe, it is also possible to make small the spring constant of the elastic functioning portion and thereby prevent the impairment of the sample and the tip of the probe.

FIG. 3 is a sectional view illustrating the construction of an optical waveguide probe that has a constricted portion according to a third embodiment of the present invention.

With respect to the embodiment illustrated in FIG. 1, this third embodiment has a construction wherein a constricted portion 8 has been disposed in a part of the elastic functioning portion 4. By disposing the constricted portion 8 in a part of the elastic functioning portion 4, it is possible to make smaller in value the spring constant of the elastic functioning portion 4. The function and effect that are attainable by the above-mentioned construction of the optical waveguide probe have no difference from those which are attainable by the embodiment illustrated in FIG. 1.

Figure 4:
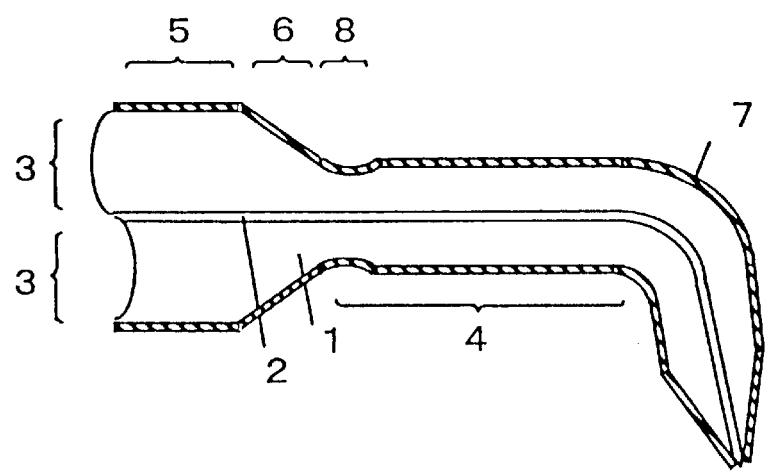
FIG. 4 is a sectional view illustrating a hook-shaped probe with a constricted portion according to a fourth embodiment of the present invention.

FIG. 4 is a sectional view illustrating the construction of a hook-shaped optical waveguide probe with a constricted portion according to a fourth embodiment of the present invention.

With respect to the embodiment illustrated in FIG. 2, this fourth embodiment has a construction wherein the constricted portion 8 has been disposed in a part of the elastic functioning portion 4. By disposing the constricted portion 8 in a part so the elastic functioning portion 4, it is possible to make smaller the spring constant of the elastic functioning portion 4. The function and effect that are attainable by the above-mentioned construction of the optical waveguide probe have no difference from those which are attainable by the embodiment illustrated in FIG. 3.

Although in FIGS. 3 and 4 illustration has been made of the example wherein the constricted portion 8 has been formed in the boundary zone between the level difference portion 6 and the elastic functioning portion 4, the constricted portion 8 can be formed at any position of the elastic functioning portion 4. On the other hand, the configuration of this constricted portion 8 can be also made into a flat configuration. By making the probe flat so as for this probe to become thin in the flexure direction thereof, thereby making the spring constant of the AFM probe small as viewed in the flexure direction thereof and, in making the spring constant thereof large as viewed in a direction perpendicular to the flexure direction, it is possible to suppress the displacement of the probe in this perpendicular direction.

Figure 5:
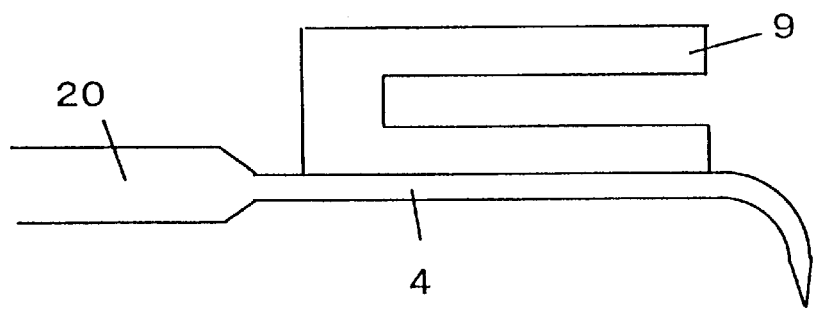
FIG. 5 is a view illustrating the construction of a probe with a piezoelectric member according to a fifth embodiment of the present invention.

FIG. 5 is a view illustrating the construction of an optical waveguide probe having a piezoelectric member according to a fifth embodiment of the present invention.

The figure represents the construction wherein a turning-fork type quartz oscillator 9 has been installed as the piezoelectric member onto the elastic functioning portion 4 of the hook-shaped optical waveguide probe illustrated in the embodiment of FIG. 2.

Recording to the construction of the optical waveguide probe illustrated in FIG. 5, since the outside diameter of the elastic functioning portion 4 is smaller than the outside diameter of the base portion 5 and the spring constant and weight thereof are small, the effect of the quartz oscillator upon the resonance characteristic is small. Accordingly, it is possible to detect as the variation in the resonance characteristic of the quartz oscillator the atomic force acting between the surface of the sample and the tip of the probe or other forces associated with the interaction occurring therebetween.

For example, in a case where use is made of an ordinary optical fiber having a cladding diameter of 125 $\mu$m, if the quartz oscillator is one whose resonance frequency is 32 kHz and whose spring constant is approximately 2000 N/m or so, the use of this quartz oscillator is possible. However, if the optical fiber probe is one whose elastic functioning portion 4 is made to have a diameter of approximately 10 $\mu$m or so, it becomes possible to use a quartz oscillator whose spring constant is approximately 20 N/m or so.

While in the embodiment of FIG. 5 illustration has been made of the construction wherein the turning-fork type quartz oscillator 9 is installed onto the hook-shaped optical waveguide probe illustrated in the embodiment of FIG. 2, even when the turning-fork type quartz oscillator 9 has been installed onto the optical waveguide probe illustrated in the embodiment of FIG. 4 or onto the straight line-shaped optical waveguide probe illustrated in the embodiment of FIG. 1 or 3, the same function and effect can be obtained. Also, here, the quartz oscillator 9 is not always needed to be of a turning-fork type. Namely, even if the quartz oscillator is only one leg portion thereof having the probe mounted thereon, it can operate as the quartz oscillator. Also, if the piezolectric member is one which has piezoelectric characteristics in the flexure direction of the optical waveguide probe, it is usable even when it is not a quartz oscillator.

Figure 6A:
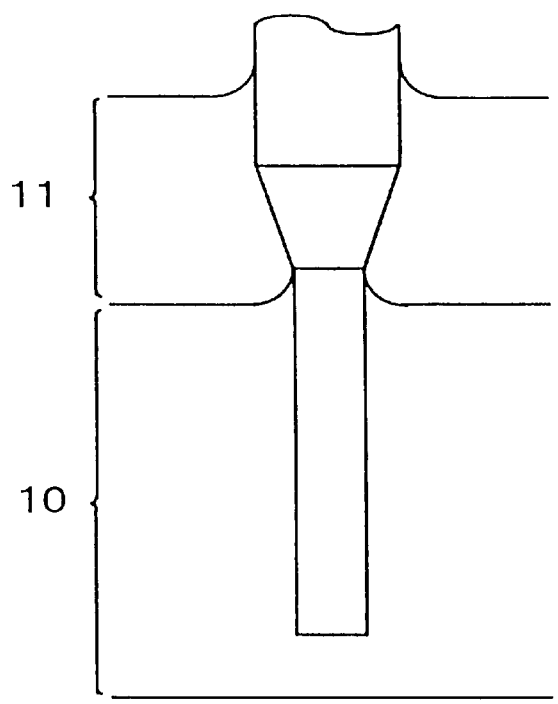
FIGS. 6(A), 6(B) and 6(C) are views illustrating a manufacturing method for manufacturing a probe according to the present invention.
Figure 6B:
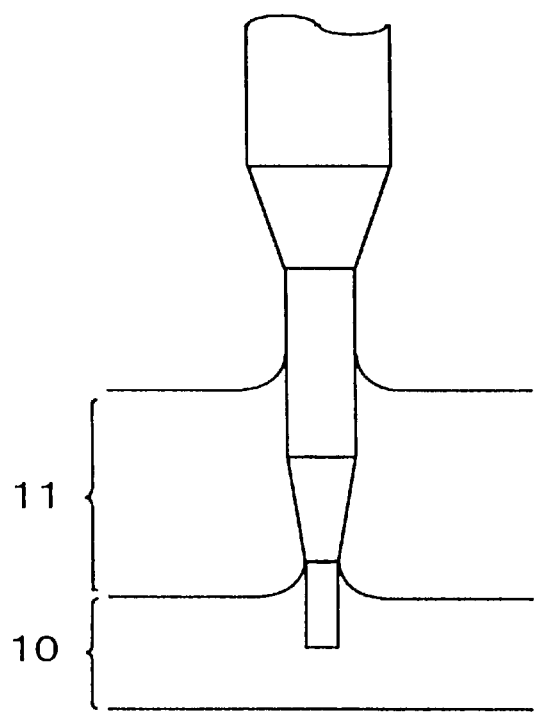

FIGS. 6(A) and 6(B) are views that represent a manufacturing method for manufacturing an optical waveguide probe according to the present invention.

FIG. 6(A) represents the step of decreasing the outside diameter of the optical fiber 1 and represents a state where the portion of the optical fiber 1 whose outside diameter is decreased has been immersed in an etching solution. The etching solution is composed of two layers, one being a first solution layer 10 that consists mainly of hydrofluoric acid and the other being a second solution layer 11 that is smaller in specific gravity than the first solution layer and that does not react, and is not mixed, with the first solution layer. As the first solution layer 10 there is used an aqueous solution of hydrofluoric acid or a mixed solution of hydrofluoric acid and ammonium fluoride. While as the second solution layer 11 there is used an organic solvent such as hexane, heptane or octane, fats and fatty oils such as mineral oil, vegetable oil, chemosynthesis oil, etc., it is also possible to use another solution that is smaller in specific gravity than the first solution layer 10 and that does not react, and is not mixed, with the first solution.

The synthetic resin cladding of the optical fiber 1 is removed from the terminal end thereof over a range of from 1 cm to 10 cm to thereby clean the surface thereof. Next, the portion of the optical fiber 1 that covers from the terminal end thereof over a range of from 0.5 mm to 50 mm is inserted into the first solution layer 10 of the etching solution. At this time, the etching action on the optical fiber proceeds within the first solution layer 10 of the etching solution, whereby the portion thereof that corresponds to the elastic functioning portion 4 goes on being formed thin. At the interfacial portion between the first solution layer 10 and the second solution layer 11 the level difference portion 6 in the boundary zone between the base portion 5 and the elastic functioning portion 4 is formed to be tapered due to the meniscus action.

FIG. 6(B) represents the step of sharpening the tip portion of the optical fiber 1 and represents a state where the portion of the optical fiber 1 that is to be made sharp has been immersed in an etching solution. This sharpening step is disclosed by Dennis R. Turner et al (U.S. Pat. No. 4,469, 554).

After having etched in the step illustrated in FIG. 6(A) the elastic functioning portion 4 up to a desired outside diameter, the optical fiber 1 is drawn up from the etching solution by a portion thereof that corresponds to the length of the elastic functioning portion 4. At this time, at the interfacial portion between the first solution layer 10 and the second solution layer 11, the tip portion of the optical fiber 1 is tapered to be sharpened due to the meniscus action. When the portion of the optical fiber 1 that is immersed in the first solution layer 10 has been completely etched, this etching is ended.

Although in FIG. 6(B) illustration has been made of the step of sharpening by the chemical etching, this step of sharpening is also executable with the heating and stretching step as well. After having etched the elastic functioning portion 4 by the method illustrated in FIG. 6(A), stretching to each end while heating the portion of the probe that is desired to be sharpened is performed to thereby sharpen this desired portion. As the heating means it is possible to use a method of condensing and applying a carbon dioxide laser light or a method of passing the optical fiber through a coiled platinum wire at the center and passing an electric current through the platinum wire and heating the same.

Figure 6C:
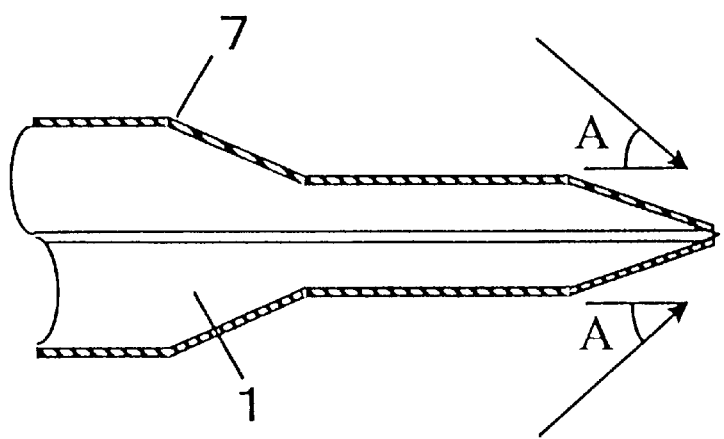

FIG. 6(C) is a sectional view illustrating the step of depositing the metal film cladding 7 onto the tip portion of the optical fiber formed in the step previously illustrated that excludes the aperture portion thereof. As the deposition method for depositing the metal film cladding 7 there is used an anisotropic thin film deposition method such as vacuum deposition, sputter, etc. and the film thickness thereof is selected from within a range of from 20 nm to 1000 nm. The deposition direction is directed toward a backward portion of the tip portion of the optical fiber as indicated by the arrows in FIG. 6(C) and the angle A is selected from within a range of from 20 degrees to 90 degrees. The size of the aperture can be varied according to the size of the sharpened tip of the optical fiber, film thickness of the metal film cladding 7 and deposition angle thereof.

According to the above-mentioned manufacturing method for manufacturing the optical waveguide probe, as illustrated in the steps of FIGS. 6(A) and 6(B), the step of making the elastic functioning portion 4 thin and the step of sharpening can be easily executed using the same etching solution. Also, since the level difference portion 6 in the boundary zone between the base portion 5 and the elastic functioning portion 4 can be easily tapered, when performing metal film cladding in the step illustrated in FIG. 6(C) it is possible to completely clothe the level difference portion and thereby prevent the occurrence of light leakage from the probe.

Although FIGS. 6(A), 6(B) and 6(C) have illustrated the manufacturing process steps for manufacturing the straight line-shaped optical waveguide probe, it is possible to manufacture the hook-shaped optical waveguide probe that has been illustrated in FIG. 2 in the same way.

Figure 7A:
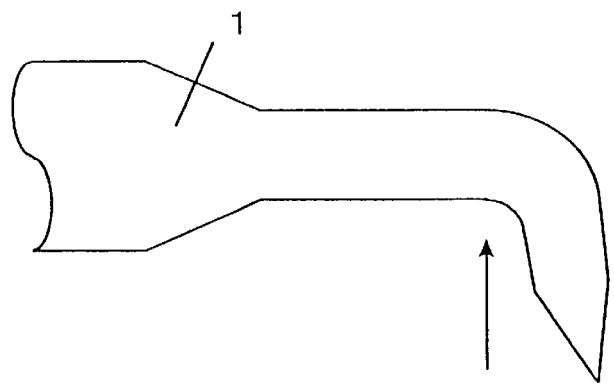
FIGS. 7(A) and 7(B) are views illustrating a manufacturing method for manufacturing a hook-shaped probe according to another embodiment of the present invention.
Figure 7B:
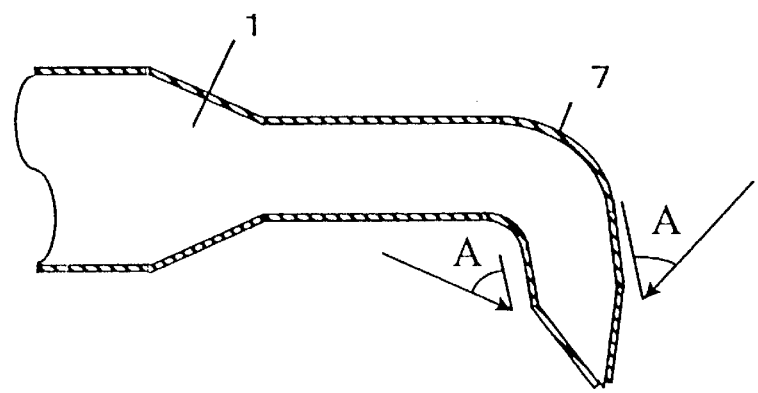

FIGS. 7(A) and 7(B) are views illustrating a manufacturing method for manufacturing a hook-shaped optical waveguide probe according to another embodiment of the present invention.

By the same method as that which has been used in the process steps illustrated in FIGS. 6(A) and 6(B), the outside diameter of the elastic functioning portion 4 is made small and the tip portion thereof is made sharp. Thereafter, as illustrated in FIG. 7(A), a carbon dioxide gas laser light is applied onto a portion of the optical fiber that covers from a sharpened tip thereof to within a range of from 0.1 mm to 2 mm and, when the angle that is defined therein prior to its being deformed be 0 degree, this portion is thereby deformed into a hook-like configuration whose bend angle is in a range of from 60 degrees to 90 degrees or so. At this time, since the amount of heat absorbed by a side of this portion having a laser light applied thereonto is larger than the amount of heat absorbed by the opposite reverse side, due to the surface tension resulting from the softening thereof the tip portion of the optical fiber is bent at and toward the side where the laser light is applied. The adjustment of this bend angle can be performed by controlling the output of the laser light while confirming the extent by which the bend is being made.

FIG. 7(B) is a sectional view illustrating the step of depositing the metal film cladding 7 onto the tip portion that excludes the aperture portion. The step illustrated in FIG. 7(B) is the same as the step illustrated in FIG. 6(C) excepting that the deposition direction of the metal film cladding 7 differs as a result of the tip portion of the probe being shaped like a hook. The angle A at which the deposition direction is defined is selected from within an angular range of from 20 degrees to 90 degrees with respect to the direction in which the tip portion is directed. In a case where on account of the tip portion being shaped like a hook cladding cannot be performed at one film forming time up to the elastic functioning portion 4 and the base portion 5, there is executed the step of forming the aperture portion, then clothing the aperture portion by a resist material, then clothing the elastic functioning portion 4 and base portion 5 separately by a metal film and lifting off the resist material, whereby manufacture can be made of a probe that is small in background light.

The function and effect that are attainable with the optical waveguide probe manufacturing method that is illustrated in FIG. 7 are the same as those which are attainable with the optical waveguide probe manufacturing method that is illustrated in the embodiment of FIG. 6.

Also, when the hook-shaped optical waveguide probe is used by being loaded on the near field scanning microscope, if the probe displacement detection method is executed with the use of an "optical lever", it is needed to form a reflection surface therefor with respect to the probe. In this case, after having formed the tip portion of the probe into a hook by the use of the method illustrated in FIG. 7(A) and before depositing the metal film cladding 7, the reflection surface is formed with respect to a rear surface of the hook-shaped portion through mechanical abrasion, whereupon the resulting probe is used.

Next, an explanation will be given of a manufacturing method for manufacturing an optical waveguide probe with the constricted portion 8 according to the present invention.

Figure 8A:
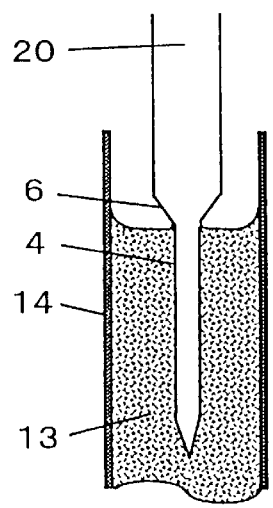
FIGS. 8(A), 8(B) and 8(C) are views illustrating a manufacturing method for manufacturing a probe with a constricted portion according to the present invention.
Figure 8B:
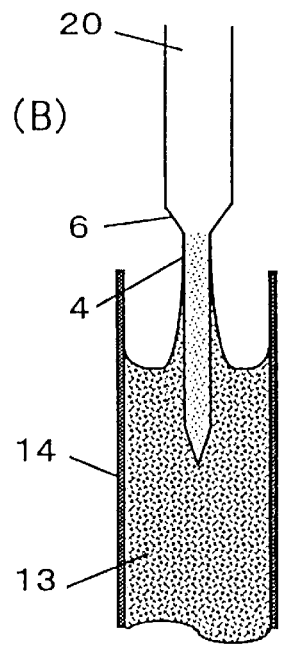
Figure 8C:
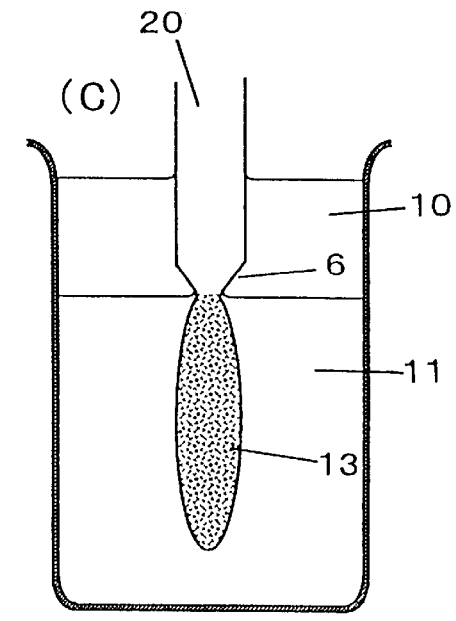

First, the elastic functioning portion 4 of the optical fiber 1 is decreased down to a desired outside diameter by executing the steps illustrated in FIGS. 6(A) and 6(B) to thereby sharpen the tip portion thereof. Next, a protective film 13 is formed on the tip portion of the optical waveguide probe and the elastic functioning portion 4 thereof. FIG. 8(A) represents a state where the tip portion of the optical waveguide probe and the elastic functioning portion. 4 are immersed in a protective film 13 solution. The protective film 13 solution is filled into a capillary 14, after which an optical waveguide probe 20 is immersed, while being observed by the microscope, up to the boundary between the level difference portion 6 and the elastic functioning portion 4 or up to a position that is lowered therefrom. FIG. 8(B) represents a state where the optical waveguide probe 20 has been drawn up by approximately a half thereof. By repeating the steps of (A) and (B), it is possible to form the protective film 13 on the tip portion of the optical waveguide probe and elastic functioning portion 4. Next, the constricted portion is formed by etching. FIG. 8(C) represents a state where the optical waveguide probe 20 having had the protective film 13 formed on the tip portion and elastic functioning portion 4 thereof is being immersed in an etching solution. The optical waveguide probe 20 is immersed in the etching solution in such a way that the boundary portion between the level difference portion 6 thereof and the protective film 13 is in conformity with the interfacial portion between a first solution layer 10 and second solution layer 1 of the etching solution to thereby decrease the outside diameter of the boundary portion to a desired diameter and thereby form the constricted portion. The etching solution that is used in this constricted portion forming step is the same as that which was used in the step illustrated in FIG. 6 which decreases the outside diameter of the probe and sharpens the tip portion thereof. Next, the protective film is removed using a solvent, whereby the metal film cladding 7 is deposited on the tip portion of the optical fiber that excludes the aperture portion through the execution of the step illustrated in FIG. 6(C).

Although in the embodiment of FIG. 8(A) illustration has been made of the method of forming the protective film 13 by the use of a capillary, it is also possible to form the protective film 13 by, with no capillary being used, filling a protective film material in an ordinary receptacle and immersing the optical waveguide probe up to a prescribed position while observing with the use of the microscope. As the material of the protective film there is used a resist material that has a resistance to fluoric acid.

Also, although in the embodiment of FIG. 8 illustration has been made of the manufacturing method for manufacturing a straight line-shaped optical waveguide probe, the constricted portion 8 can be also formed similarly with respect to even the hook-shaped optical waveguide probe illustrated in FIG. 2. Also, by forming the constricted portion 8 of the optical waveguide probe by the manufacturing method illustrated in FIG. 8 and thereafter shaping the configuration thereof into a hook by executing the step that is illustrated in the manufacturing method illustrated in FIG. 7, it is also possible to form the hook-shaped optical waveguide probe that has the constricted portion 8 illustrated in FIG. 4.

Figure 9:
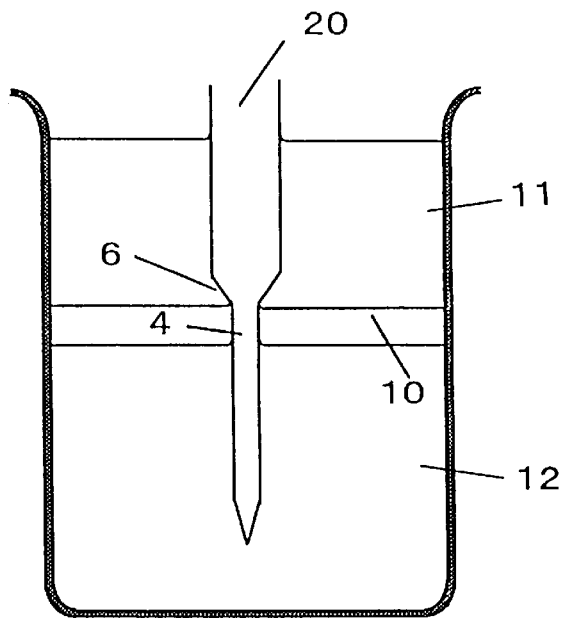
FIG. 9 is a view illustrating a manufacturing method for manufacturing a probe with a constricted portion according to the present invention.

FIG. 9 is a view illustrating another manufacturing method for manufacturing the optical waveguide probe that has a constricted portion according to the present invention.

The figure represents a state where the boundary zone between the level difference portion 6 of the optical waveguide probe 20 and the elastic functioning portion 4 is immersed in the interracial portion between the first solution layer 10 and the second solution layer 11 of the etching solution. The etching solution that has been used here is composed of three layers, a first one thereof being the first solution layer 10 that consists mainly of hydrofluoric acid, a second one thereof being the second solution layer 11 that is smaller in specific gravity than the first solution layer and that does not react, and is not mixed, with the first solution layer, and a third one thereof being a third solution layer 12 that is larger in specific gravity than the first solution layer 10 and that does not react, and is not mixed, with any one of the first and second solution layers. As the third solution layer there is used an organic solvent including carbon tetrachloride which contains chlorine and is large in specific gravity. According to the etching method illustrated in FIG. 9, since the etching action of the optical waveguide probe 20 proceeds with only the portion thereof that corresponds to the first solution layer 10, it is possible to form the constricted portion that corresponds to the thickness of the first solution layer 10.

Also, when forming the constricted portion with the three-layer structure etching solution, it is needed to make the length of the constricted portion 1 mm or less. For this reason, it is needed to make thin the thickness of the first solution layer 10. By adding a surface active agent to the first solution layer 10 in order to decrease the surface tension thereof, it is possible to make thin the thickness of the first solution layer 10.

Although in the constricted portion forming method that has been illustrated in the embodiment of FIG. 9 it is not needed to clothe the tip portion of the optical waveguide probe 20 and elastic functioning portion 4 by a protective film, by clothing the tip portion of the optical waveguide 20 by the protective film 13 by the embodiment illustrated in FIG. 8(A) it is possible to prevent the impairment of the tip portion of the optical waveguide probe 20 that occurs when inserting this probe into, or drawing it out from, the etching solution.

Although in the embodiment illustrated in FIG. 9 illustration has been made of the manufacturing method for manufacturing the straight line-shaped optical waveguide probe illustrated in FIG. 1, same handling can be also performed of the optical waveguide probe shaped like a hook that has been illustrated in the embodiment of FIG. 2. Also, by forming the constricted portion 8 of the optical waveguide probe by the embodiment illustrated in FIG. 9 and thereafter shaping the configuration thereof into a hook by executing the step illustrated in the embodiment of FIG. 7, it is also possible to form the hook-shaped optical waveguide probe that has the constricted portion 8 illustrated in FIG. 4.

Figure 10:
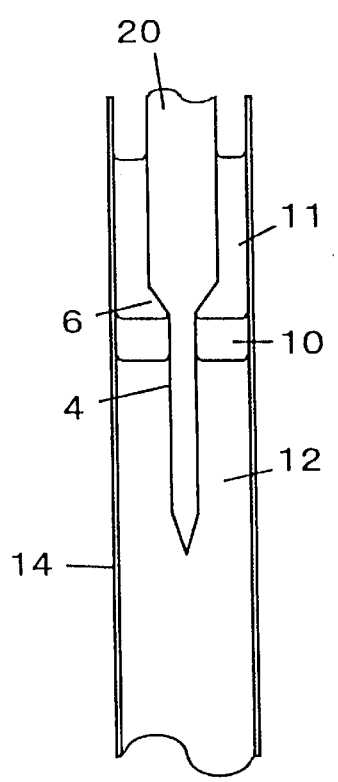
FIG. 10 is a view illustrating a manufacturing method for manufacturing a probe with a constricted portion according to the present invention.

FIG. 10 is a view illustrating a variation that presents another optical waveguide probe manufacturing method that has the constricted portion according to the present invention. This figure represents a state where the boundary between the level difference portion 6 and elastic functioning portion 4 of the optical waveguide probe 20 is immersed in the etching solution so as to be kept in conformity with the interfacial portion between the first solution layer 10 and second solution layer 11 thereof, and this variation differs from the embodiment illustrated in FIG. 9 in that the etching solution has been filled in a capillary. By filling the etching solution in the capillary, it is possible to make thin the first solution layer 10 by the action of the surface tension that occurs between the etching solution and the wall surface of the capillary.

Also, the constricted portion 8 can be formed also by working that uses a focused ion beam (Focused Ion Beam) technique. According to this FIB technique, since the side surface of a prescribed portion of the elastic functioning portion 4 can be shaved off, it is possible to form easily the constricted portion that has a flat configuration.

Figure 11:
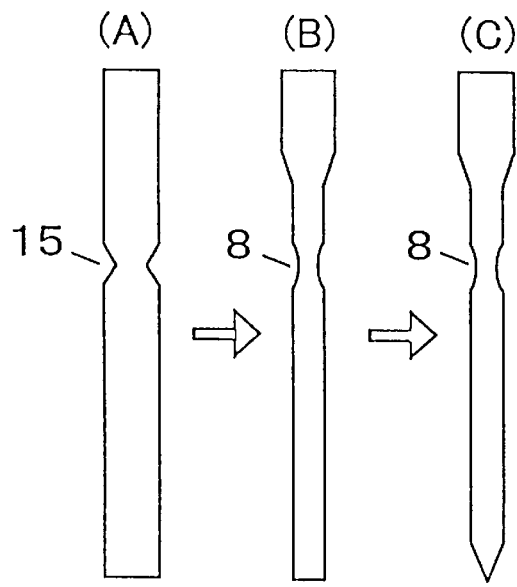
FIG. 11 is a view illustrating a manufacturing method for manufacturing a probe with a constricted portion according to the present invention.

Also, as the method of forming the constricted portion that has a flat configuration, first, as illustrated in FIG. 11(A), recessed portions 15 are formed in advance by abrasion in opposing side surfaces of the optical fiber. When the step illustrated in FIG. 6 is executed with respect to this optical finer, it is possible to decrease the outside diameter of the fiber portion that excludes these recessed portions as illustrated in FIG. 11(B). By further executing the step of sharpening the tip portion, it is possible to form the constricted portion 8 that has a flat configuration as illustrated in FIG. 11(C).

Figure 12:
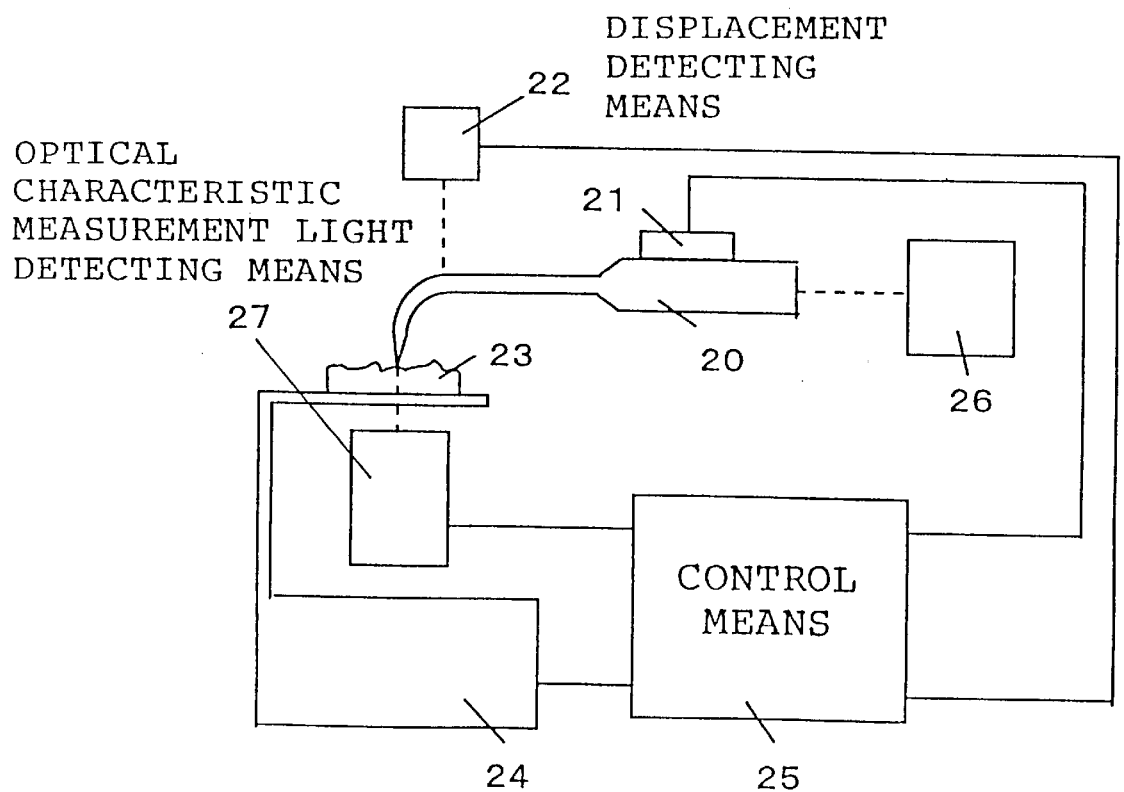
FIG. 12 is a view illustrating the construction of a scanning probe microscope that uses the probe of the present invention.

Next, the construction of the scanning probe microscope that uses the probe of the present invention will be explained using a near field scanning microscope as an example. FIG. 12 is a view illustrating the construction of a near field scanning microscope that uses an optical waveguide probe according to the present invention.

The hook-shaped optical waveguide probe 20 that is illustrated in the embodiment of FIG. 2 or 4 is installed, through the base portion 5, on a bimorph 21 which is a vibration means. Then, the tip of the optical waveguide probe 20 is vertically vibrated relative to a sample 23, whereby the atomic force that acts between the tip of the optical waveguide probe 20 and the surface of the sample 23 or other forces such as magnetic force, electrostatic force, etc. which are associated with the interaction between the two are detected by displacement detecting means 22 as the variation in the vibration characteristics of the optical waveguide probe 20. Then, the sample is moved and scanned by an XYZ movement mechanism 24 while controlling the interval between the tip of the optical waveguide probe 20 and the surface of the sample 23 by control means 25 so as to keep it to be fixed, thereby measuring the surface topography. Simultaneously, the light from an optical characteristic measurement light source 26 is introduced into the optical waveguide probe 20. Then, this light is radiated onto the sample 23 from the aperture that is at the tip of the optical waveguide probe 20 to thereby make detection thereof by an optical characteristic measurement light detecting means 27 and thereby make measurement of the optical characteristic in a fine region of the sample.

Although FIG. 10 has illustrated the transmission type construction wherein the measurement light is detected at the back of the sample 23, a reflection type construction for detecting the measurement light from the surface of a sample and a construction for detecting the light by means of the optical waveguide probe 20 are also possible to make. Also, although, usually, an optical lever is used as the displacement detecting means 22, if there is used a optical waveguide probe with piezoelectric member that is illustrated in FIG. 5, the use of the displacement detecting means becomes unnecessary.

Also, although FIG. 12 has illustrated the apparatus construction for vibrating the optical waveguide probe 20, an apparatus construction which does not use a bimorph 21 and performs measurement as a contact mode of AFM is also possible to make. Compared to the case of vibrating the optical waveguide probe 20, in the case of operating as a contact mode of AFM, usually, if the spring constant of the elastic functioning portion of the probe is high in magnitude, it is very likely that impairment may be caused of the tip of the optical waveguide probe 20 and the sample. Since the optical waveguide probe 20 of the present invention makes it possible to make the spring constant of the elastic functioning portion small in magnitude, it is possible to easily perform high-resolution measurement with the use of a contact mode of AFM.

Further, in the case of operating as a contact mode of AFM by the use of the optical waveguide probe 20 according to the present invention, if the displacement detecting means 22 illustrated in FIG. 10 is made to have an additional function as that of torsion detecting means for detecting the torsion of the optical waveguide probe 20 during scan thereof or torsion detecting means is provided separately, it is possible to detect as the torsion of the probe the frictional force that acts between the probe and the surface of the sample during scan. That is, it is possible to operate as a scan-type frictional force microscope by the use of the optical waveguide prone 20, whereby it becomes possible to make comparison measurement between the frictional force occurring on the surface of the sample and the optical characteristic thereof. If, for example, a photo-detector that serves as an optical lever is prepared from a photo-diode that has vertical/horizontal 4-division light receiving surfaces and this photo-diode is used as the torsion detecting means, the displacement of the optical waveguide probe 20 can be detected by a difference between the signals from the vertical two-division light receiving surfaces of the photo-diode while, on the other hand, the torsion of the optical waveguide probe 20 can be detected by a difference between the signals from the horizontal two-division light receiving surfaces of the photo-diode.

Also, if there is made a construction wherein with the straight line-like probe illustrated in FIG. 1 or 3 being used the tip portion of the probe is vibrated horizontally relative to the surface of the sample 23, it is possible to realize by utilizing the displacement force acting between the tip of the probe and the surface of the sample a near field scanning microscope that is adapted to scan so as to keep fixed the interval between the tip of the probe and the surface of the sample.

Further, if a covering for being applied onto a liquid receptacle is provided to each of the above-mentioned near field scanning microscope so that the probe and sample may be held in a liquid, it is possible to perform measurement in a liquid.

Although in the foregoing description the optical waveguide probe has been explained, this probe can be used as a probe for use on AFM only. In this case, the provision of the metal cladding film on the tip portion is unnecessary with the result that the tip portion can be shaped into a sharper configuration. As the probe material there can be used an optical fiber, glass fiber, fine metal wire, etc. As the characteristic of the optical waveguide probe that is exhibited when it has been used as an AFM probe, particularly in a mode for detecting the atomic force by vibrating the probe in a liquid, compared to a conventional AFM probe which is made up into a plate structure and therefore undergoes the effect of the viscosity of the disturbance vibration that propagates through the interior of the liquid, the probe of the present invention exhibits very stable resonance characteristic to thereby enable stable measurement.

As has been explained above, according to the construction of the probe, and the manufacturing method, of the present invention, it is possible to make small in value the spring constant of the elastic functioning portion and measure a soft sample without deforming it. Also, it is possible to prevent the impairment of the sample and the tip of the probe. Also, by tapering the level difference in the boundary zone between the base portion and the elastic functioning portion, it is possible to enhance the clothability of the level difference portion by the metal film and thereby prevent the occurrence of the optical leakage of the optical waveguide probe. Further, in the case of loading on a probe of a type performing scanning control by utilizing the resonance of the probe, in which the tip of the probe is vibrated horizontally or vertically relative to the surface of the sample, it is possible to shorten the elastic functioning portion without increasing the spring constant to thereby increase the resonance frequency and hence increase the scanning speed. Also, it is possible to perform AFM measurement in contact mode. As a result, measurement can be performed with the near field intensity being theoretically kept in a maximum state. And further horizontal resolution of the sample surface is enhanced. Particularly, if the optical waveguide probe according to the present invention is used by being loaded on the near field scanning microscope, two data quantities, i.e., the irregularities and optical characteristics of the sample surface, can be measured simultaneously and with higher resolution.

Also, when measuring in the mode in which the probe is vibrated in a solution, stable measurement is possible as compared to a measurement which uses the conventional plate-like AFM probe.

What is claimed is:

1. A probe for a surface scanning microscope, the probe comprising:
   a sharp tip portion for detecting an atomic force;
   an elastic functioning portion disposed in the vicinity of the sharp tip portion; and
   a circular cylindrical base portion for supporting the elastic functioning portion and formed integrally with the elastic functioning portion, an outer configuration of the elastic functioning portion being thinner than an outer configuration of the circular cylindrical base portion.

2. A probe for a surface scanning microscope and comprised of an optical waveguide comprising:
   a sharp tip portion for detecting an atomic force, the sharp tip portion having at an end thereof an aperture for permitting the transmission therethrough of light and having a metal film disposed on the end of the sharp tip portion except for the aperture;
   an elastic functioning portion disposed in the vicinity of the sharp tip portion; and
   a base portion for supporting the elastic functioning portion and formed integrally with the elastic functioning portion, an outer configuration of the elastic functioning portion being thinner than an outer configuration of the base portion.

3. A probe as set forth in claim 1; wherein the elastic functioning portion has a constricted portion having a thinner outer configuration than other parts of the elastic functioning portion.

4. A probe as set forth in claim 1; wherein a level difference in a boundary between the circular cylindrical base portion and the elastic functioning portion is tapered.

5. A probe as set forth in claim 3; wherein the constricted portion of the elastic functioning portion has a generally flat-shaped cross-section.

6. A probe as set forth in claim 1; wherein the probe comprises an optical fiber.

7. A probe as set forth in claim 1; wherein the elastic functioning portion has a generally hook-shaped tip portion.

8. A probe as set forth in claim 1; wherein the elastic functioning portion has a generally straight line-shaped tip portion.

9. A probe as set forth in claim 1; further comprising a piezoelectric member integrally connected with the elastic functioning portion for electrically detecting a distortion that has occurred in the elastic functioning portion.

10. A probe as set forth in claim 9; wherein the piezoelectric member comprises a quartz oscillator.

11. A method for manufacturing a probe, comprising the steps of:
    decreasing the outside diameter of a part of a generally cylindrical-shaped probe to produce a part having a low spring constant; and
    sharpening an end of the part of the probe having the decreased outside diameter to form a sharp tip portion.

12. A method for manufacturing a probe, comprising the steps of:
    decreasing the outside diameter of a part of a generally cylindrical-shaped probe to produce a part having a low spring constant;
    sharpening an end of the part of the probe having the decreased outside diameter; and
    forming a constricted portion in a part of an elastic functioning portion of the probe by chemical etching.

13. A method for manufacturing a probe, comprising the steps of:
   shaving off a part of a side surface of a generally cylindrical-shaped probe;
   decreasing the outside diameter of the portion of the probe which includes the shaved off part to produce a part having a low spring constant; and
   sharpening a tip portion of the probe.

14. A method for manufacturing a probe as set forth in claim 11; further comprising the step of forming the tip portion of the probe into a hook shape.

15. A method for manufacturing a probe as set forth in claim 11; further comprising the step of depositing a metal film on the tip portion of the probe except for an aperture portion thereof.

16. A method for manufacturing a probe as set forth in claim 11; wherein the step of decreasing the outside diameter of a part of the probe and the step of sharpening an end of the part of the probe comprise wet chemical etching steps using the same etching solution, the wet chemical etching steps further comprising a step of immersing the probe in an etching solution to thereby decrease the outside diameter of the part thereof, thereafter drawing the probe to a required length thereof and further continuing the etching steps to thereby form the sharp tip portion of the probe.

17. A method for manufacturing a probe as set forth in claim 11; wherein the step of sharpening the end of the part of the probe having the decreased outside diameter comprises applying a pulling force to the probe while heating the probe by heating means and pulling it to breakage.

18. A method for manufacturing a probe as set forth in claim 12; wherein the step of forming a constricted portion in a part of the elastic functioning portion comprises forming a protective film on a tip portion of the probe and on a part, or the whole, of the elastic functioning portion to thereby form a constricted portion by wet chemical etching.

19. A method for manufacturing a probe as set forth in claim 11; further comprising the step of forming a constricted portion on the probe.

20. A method for manufacturing a probe as set forth in claim 19; wherein the step of decreasing the outside diameter of the probe, the step of forming the sharp tip portion of the probe and the step of forming the constricted portion of the probe are carried out using an etching tub consisting of a first solution layer composed mainly of hydrofluoric acid and a second solution layer which has a lower specific gravity than the first solution layer and which does not react, and is not mixed, with the first solution layer.

21. A method for manufacturing a probe as set forth in claim 12; wherein the step of forming the constricted portion includes the step of using an etching tub consisting of a first solution layer that consists mainly of hydrofluoric acid, a second solution layer having a lower specific gravity than the first solution layer and which does not react, and is not mixed, with the first solution layer, and a third solution layer having a greater specific gravity than the first solution layer and which does not react, and is not mixed, with any one of the first and second solution layers.

22. A method for manufacturing a probe as set forth in claim 21; wherein the first solution layer contains a surface active agent.

23. A method for manufacturing a probe as set forth in claim 21; wherein the first, second and third solution layers are disposed in a capillary.

24. A scanning probe microscope for measuring a topography of a sample by using an atomic force acting between the sample and a probe, the scanning probe microscope comprising:
   a probe having a sharp tip portion for detecting an atomic force, an elastic functioning portion disposed in the vicinity of the sharp tip portion, and a base portion for supporting the elastic functioning portion and formed integrally with the elastic functioning portion, an outer configuration of the elastic functioning portion being thinner than an outer configuration of the base portion;
   vibrating means for horizontally or vertically vibrating one of the tip portion of the probe and a surface of a sample relative to the other;
   detecting means for detecting a displacement of the probe; and
   control means for maintaining an interval between the tip portion of the probe and the surface of the sample at a fixed value according to a detection signal output from the detecting means.

25. A scanning probe microscope for measuring a topography of a sample by using an atomic force acting between the sample and a probe and for measuring optical information of the sample by using a light irradiated to or detected from the sample, the scanning probe microscope comprising:
   a probe having a sharp tip portion for detecting an atomic force, an elastic functioning portion disposed in the vicinity of the sharp tip portion, and a base portion for supporting the elastic functioning portion and formed integrally with the elastic functioning portion, an outer configuration of the elastic functioning portion being thinner than an outer configuration of the base portion;
   vibrating means for horizontally or vertically vibrating one of the tip portion of the probe and a surface of a sample relative to the other;
   detecting means for detecting a displacement of the probe;
   control means for maintaining an interval between the tip portion of the probe and the surface of the sample at a fixed value according to a detection signal output from the detecting means; and
   measuring means for measuring optical information of the sample using light irradiated to or detected from the sample.

26. A scanning probe microscope for measuring a topography of a sample by contacting a probe with a surface of a sample, the scanning probe microscope comprising:
   a probe having a sharp tip portion for detecting an atomic force, an elastic functioning portion disposed in the vicinity of the sharp tip portion, and a base portion for supporting the elastic functioning portion and formed integrally with the elastic functioning portion, an outer configuration of the elastic functioning portion being thinner than an outer configuration of the base portion;
   vibrating means for horizontally or vertically vibrating one of the tip portion of the probe and a surface of a sample relative to the other;
   detecting means for detecting a displacement of the probe; and
   control means for maintaining an interval between the tip portion of the probe and the surface of the sample at a fixed value according to a detection signal output from the detecting means.

27. A scanning probe microscope for measuring a topography of a sample by contacting a probe with a surface of a sample and for measuring an optical information of the sample by using a light irradiated to or detected from the sample, comprising:
   a probe having a sharp tip portion for detecting an atomic force, an elastic functioning portion disposed in the vicinity of the sharp tip portion, and a base portion for supporting the elastic functioning portion and formed integrally with the elastic functioning portion, an outer configuration of the elastic functioning portion being thinner than an outer configuration of the base portion;

vibrating means for horizontally or vertically vibrating one of the tip portion of the probe and a surface of a sample relative to the other;

detecting means for detecting a displacement of the probe;

control means for maintaining an interval between the tip portion of the probe and the surface of the sample at a fixed value according to a detection signal output from the detecting means; and measuring means for measuring optical information of the sample using light irradiated to or detected from the sample.

28. A scanning probe microscope as claimed in claim 24; further comprising means for detecting a torsion of the probe.

29. A scanning probe microscope as claimed in claim 25; further comprising detecting means for detecting a torsion of the probe.

30. A scanning probe microscope as set forth in claim 24; further comprising a liquid cell for retaining the probe and the sample in a liquid.

31. A scanning probe microscope as set forth in claim 29; wherein the probe is generally cylindrical-shaped.

32. A scanning probe microscope as set forth in claim 25; wherein the probe is generally cylindrical-shaped.

33. A scanning probe microscope as set forth in claim 26; wherein the probe is generally cylindrical-shaped.

34. A scanning probe microscope as set forth in claim 27; wherein the probe is generally cylindrical-shaped.

35. A probe for a surface scanning microscope, the probe comprising: an optical fiber having a sharp tip portion for detecting an atomic force, an elastic functioning portion disposed in the vicinity of the sharp tip portion, and a base portion formed integrally with the elastic functioning portion for supporting the elastic functioning portion, an outer configuration of the elastic functioning portion being thinner than an outer configuration of the base portion.

36. A probe for a surface scanning microscope, the probe comprising: an optical waveguide having a base portion, a core portion for propagating light therethrough, a sharp tip portion, and an intermediate portion having a low spring constant disposed between the base portion and the sharp tip portion.

37. A probe as claimed in claim 36; wherein the optical waveguide has a progressively decreasing outer diameter from the base portion to the sharp tip portion.

38. A probe as claimed in claim 36; wherein the sharp tip portion is generally hook-shaped.

39. A probe as claimed in claim 36; wherein the base portion is generally circular cylindrical-shaped.

40. A probe as claimed in claim 36; wherein the optical waveguide has a constricted portion disposed between the base portion and the intermediate portion.

41. A probe as claimed in claim 40; wherein the optical waveguide has a tapered portion disposed between the constricted portion and the base portion.

42. A probe as claimed in claim 36; wherein the optical waveguide has a tapered portion disposed between the base portion and the intermediate portion.

43. A scanning probe microscope comprising:

a probe having a base portion, a sharp tip portion, and an intermediate portion having a low spring constant disposed between the base portion and the sharp tip portion;

vibrating means for vibrating the sharp tip portion of the probe and a surface of a sample relative to one another;

detecting means for detecting a displacement of the probe; and control means for maintaining a distance between the sharp tip portion of the probe and the surface of the sample constant according to a detection signal output from the detecting means.

44. A scanning probe microscope as claimed in claim 43; wherein the probe has a progressively decreasing outer diameter from the base portion to the sharp tip portion.

45. A scanning probe microscope as claimed in claim 43; wherein the sharp tip portion of the probe is generally hook-shaped.

46. A scanning probe microscope as claimed in claim 43; wherein the base portion of the probe is generally circular cylindrical-shaped.

47. A scanning probe microscope as claimed in claim 43; wherein the probe has a constricted portion disposed between the base portion and the intermediate portion.

48. A scanning probe microscope as claimed in claim 47; wherein the probe has a tapered portion disposed between the constricted portion and the base portion.

49. A scanning probe microscope as claimed in claim 43; wherein the probe has a tapered portion disposed between the base portion and the intermediate portion.

50. A method for manufacturing a probe, comprising the steps of:

immersing a probe in an etching solution to decrease the outside diameter of a part of the probe by etching to produce a part having a low spring constant;

drawing the probe to a required length thereof; and continuing the etching step in the etching solution to sharpen an end of the part of the probe having the decreased outside diameter to form a sharp tip portion.

51. A method for manufacturing a probe as set forth in claim 50; further comprising the step of forming a constricted portion on the probe.

52. A method as claimed in claim 50; wherein the step of decreasing the outside diameter of the probe, the step of forming the sharp tip portion of the probe and the step of forming the constricted portion of the probe are carried out using an etching tub comprised of a first solution layer composed mainly of hydrofluoric acid and a second solution layer which has a lower specific gravity than the first solution layer and which does not react, and is not mixed, with the first solution layer.

53. A method for manufacturing a probe, comprising the steps of:

decreasing the outside diameter of a part of an optical waveguide to produce a part having a low spring constant; and sharpening an end of the part of the optical waveguide having the decreased outside diameter by applying a pulling force to the optical waveguide while heating the optical waveguide and pulling it to breakage.

54. A method for manufacturing a probe, comprising the steps of:

decreasing the outer diameter of a part of a probe to produce a part having a low spring constant;

sharpening an end of the part of the probe having the decreased outer diameter to form a sharp tip portion;

forming a protective film on the sharp tip portion of the probe and on a portion, or the whole, of the part of the probe having the decreased outer diameter; and forming a constricted portion by wet chemical etching on a portion of the part of the probe having the decreased outer diameter which is not provided with the protective film.

55. A method for manufacturing a probe, comprising the steps of:

decreasing the outside diameter of a part of a probe to produce a part having a low spring constant;

sharpening an end of the part of the probe having the decreased outer diameter to form a sharp tip portion; and forming a constricted portion on the part of the probe having the decreased outer diameter by chemical etching using an etching tub comprised of a first solution layer that consists mainly of hydrofluoric acid, a second solution layer having a lower specific gravity than the first solution layer and which does not react, and is not mixed, with the first solution layer, and a third solution layer having a greater specific gravity than the first solution layer and which does not react, and is not mixed, with any one of the first and second solution layers.

56. A method for manufacturing a probe as set forth in claim 55; wherein the first solution layer contains a surface active agent.

57. A method for manufacturing a probe as set forth in claim 21; wherein the first, second and third solution layers are disposed in a capillary.

* * * * *